G. RICHARDS.
MEANS APPLICABLE FOR USE IN MILLING SCREW THREADS.
APPLICATION FILED JUNE 9, 1919.

1,361,098.

Patented Dec. 7, 1920.

INVENTOR
Geo. Richards

UNITED STATES PATENT OFFICE.

GEORGE RICHARDS, OF WESTMINSTER, LONDON, ENGLAND, ASSIGNOR TO THE RICHARDS THREAD MILLING MACHINE COMPANY, (1918) LIMITED, OF WESTMINSTER, LONDON, ENGLAND.

MEANS APPLICABLE FOR USE IN MILLING SCREW-THREADS.

1,361,098.  Specification of Letters Patent.  Patented Dec. 7, 1920.

Application filed June 9, 1919. Serial No. 302,923.

*To all whom it may concern:*

Be it known that I, GEORGE RICHARDS, a citizen of the United States, residing at The Outer Temple, 222 Strand, in the city of Westminister, London, England, have invented new and useful Improved Means Applicable for Use in Milling Screw-Threads, of which the following is a specification.

This invention relates to improved means applicable for use in milling screw-threads with the aid of rotary cutters of the "hob" type; that is to say, cutters having teeth which follow the line of a screw-thread corresponding with the thread to be cut; the cutter and the work-piece revolving at the same rotative speed, but neither partaking of any movement in an axial direction.

My present invention is more particularly directed to the application of the hobs for screw-threading taper bodies, either externally or internally, and to means for facilitating their employment for such purposes.

Figure 1:
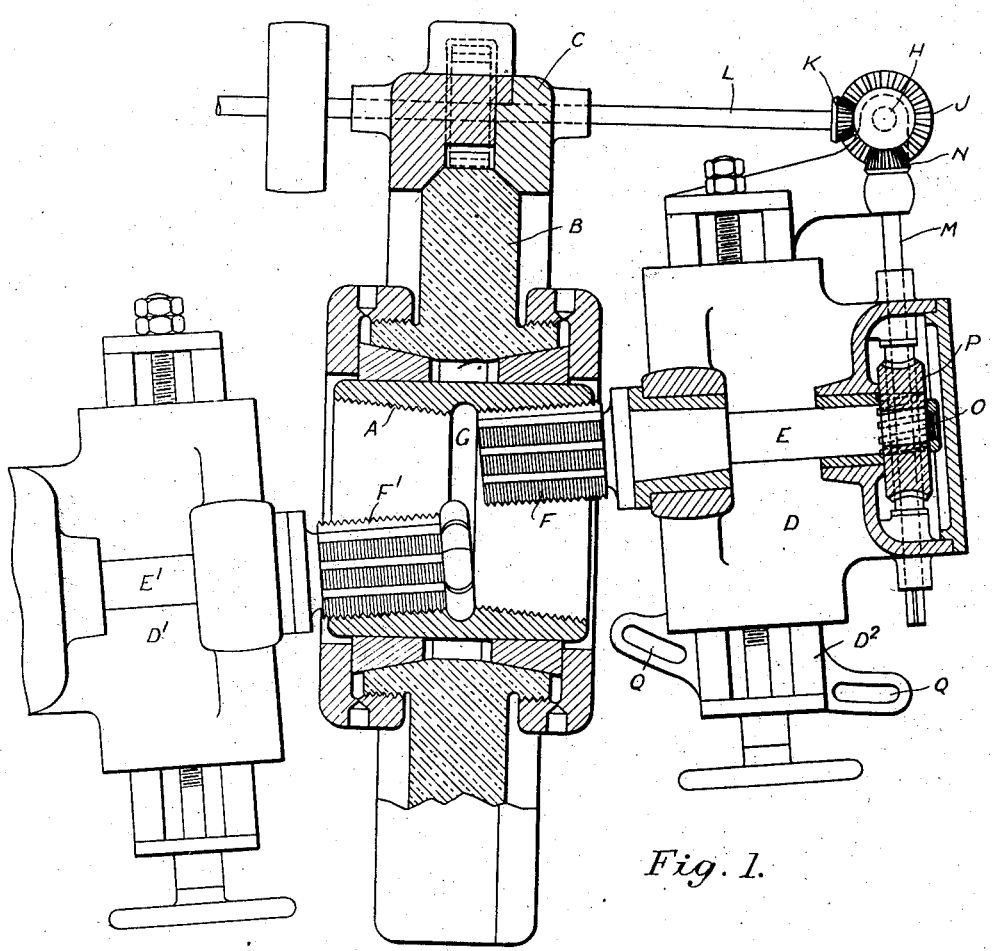
Figures 2, 3:
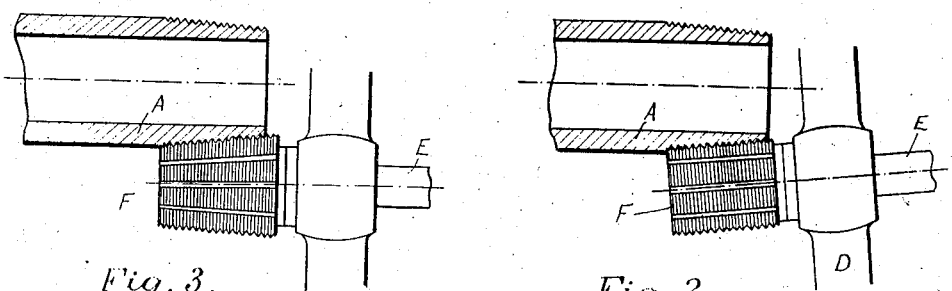

In Figure 1 of the accompanying drawings is illustrated apparatus adapted to enable the internal surface of a sleeve-like work-piece—such, for example, as is commonly employed in connecting two lengths of pipe—to be screw-threaded in two opposite directions of taper; the two operations being carried out simultaneously. Figs. 2 and 3 illustrate variations hereinafter more particularly referred to.

The work-piece A is secured in a chuck B mounted to rotate in the stationary headstock C. In bearings carried on a slide D is mounted a spindle E furnished with a parallel hob F; the spindle E being arranged at a slight inclination to the plane of the chuck B. Upon the opposite side of the headstock C is arranged a similar slide D¹, whereon is mounted a similarly inclined spindle E¹, furnished with a parallel hob F¹. In this instance, the hob is found with an extension adapted to mill the chase G between the inner extremities of the two tapered portions of the work-piece A. Each of the slide-rests whereon the slides DD¹ are mounted is pivoted about vertical axis as at H in order to admit of its being turned to suit any desired angle of taper; and each slide is moreover provided with screw traverse gear for enabling the hob, not only to be adjusted to the work, but to cut the thread to the required depth.

In order to provide for the swiveling of the slide D about the center H, the mechanism for driving the cutter F is of the following description. About the center H is mounted a bevel wheel J which derives motion from a bevel pinion K carried by the main shaft L. Mounted in bearings formed on the slide D and slide-carrier D² is a spindle M furnished with a bevel pinion N in mesh with the bevel wheel J. Sliding upon a feather in the spindle M is a worm O which gears with the worm wheel P the latter being secured upon the hob-spindle E. The entire slide D and slide-carrier D² are capable of pivoting about the center H; and having been adjusted to the desired angle of taper for the work, the carrier is fixed by means of locking nuts applied to studs which pass through the slots QQ to the machine bed. The slide D¹ and its carrier are mounted and fitted in like manner.

In Fig. 2 is illustrated the milling of a screwthread in an external taper surface; the hob being of the same character, and mounted in the manner, already described. Instead, however, of employing a parallel hob mounted on an inclined spindle, the hob may be tapered and the axis of the spindle arranged parallel with that of the work-piece, as indicated in Fig. 3.

It will be observed that, by the means described, the three operations—namely, the screw-threading of the two taper surfaces and the milling of the intermediate chase G—can be carried out simultaneously; and further that, with the aid of the apparatus described, parallel hobs are rendered applicable for use in milling screw-threads in or upon either cylindrical or conical surfaces.

I claim:—

1. Apparatus for milling screw threads in the surface of a conical body, comprising means for revolubly mounting the said body, a parallel hob having its axis of revolution inclined to the axis of revolution of the body, the axes of the hob and of the body lying in one plane, and means for simultaneously revolving the body and the hob.

2. Apparatus for milling screw threads in the surface of a conical body, comprising means for revolubly mounting the said body, a parallel hob the axis of which defines a single plane with the axis of the body, means for simultaneously revolving the body and the hob and means for adjusting the angular position of the hob relatively to the axis of revolution of the body.

3. Apparatus for milling screw threads in the surface of a conical body, comprising means for revolubly mounting the said body, a parallel hob, a sliding support for the hob, a pivotally mounted carrier for the sliding support and means for simultaneously revolving the body in the hob, said means including gear mechanism having movement about the pivot point of the carrier.

4. Apparatus for simultaneously milling screw threads in the surface of an oppositely coned body, comprising means for revolubly mounting the body, parallel hobs, means for adjusting the angular position of the hobs relatively to the axis of revolution of the body and means for simultaneously revolving the body and the hobs.

5. Apparatus for simultaneously milling screw threads in the internal oppositely coned surface of the body, comprising means for revolubly mounting the body, parallel hobs, means for adjusting the angular position of the hobs relatively to the axis of revolution of the body and means for simultaneously revolving the body and the hobs.

GEO. RICHARDS.